United States Patent [19]

Sheppard

[11] Patent Number: 4,906,154
[45] Date of Patent: Mar. 6, 1990

[54] SELF-ADJUSTING FASTENER ASSEMBLY

[76] Inventor: William L. Sheppard, 36655 Romulus Rd., Romulus, Mich. 48174

[21] Appl. No.: 140,757

[22] Filed: Jan. 4, 1988

[51] Int. Cl.$^4$ .................. F16B 23/00; F16B 35/00
[52] U.S. Cl. ................................ 411/392; 411/369; 411/383; 411/396; 267/33
[58] Field of Search .............. 411/8, 9, 368, 369, 411/383, 384, 392, 397, 907, 908, 916, 542, 544, 396; 267/33, 152; 403/228, 229, 291

[56] References Cited

U.S. PATENT DOCUMENTS

| 36,014 | 7/1862 | Meissner . |
| 964,216 | 7/1910 | Collins . |
| 969,383 | 9/1910 | Mahoney . |
| 1,146,481 | 7/1915 | Dodds . |
| 1,203,505 | 10/1916 | Dodds . |
| 1,220,908 | 3/1917 | Thomas . |
| 1,708,793 | 4/1929 | Jones . |
| 1,926,925 | 9/1933 | Wescott . |
| 3,245,142 | 4/1966 | Williams . |
| 3,468,211 | 9/1969 | Suan ........................... 411/397 |
| 4,437,286 | 3/1984 | Maguire . |
| 4,589,179 | 5/1986 | Hulting, Jr. . |
| 4,616,455 | 10/1986 | Hewison . |

FOREIGN PATENT DOCUMENTS

| 1134337 | 8/1962 | Fed. Rep. of Germany ........ 267/33 |
| 879031 | 6/1953 | German Democratic Rep. ... 267/33 |
| 379230 | 8/1964 | Switzerland ........................ 411/392 |

Primary Examiner—Neill R. Wilson

[57] ABSTRACT

A fastener having resilient means interconnecting a head portion and a threaded portion for maintaining tight axial fitment between mating parts and compression on a gasket therebetween whereby to assure a leak free mating. A method of forming the fastener is also disclosed.

21 Claims, 1 Drawing Sheet

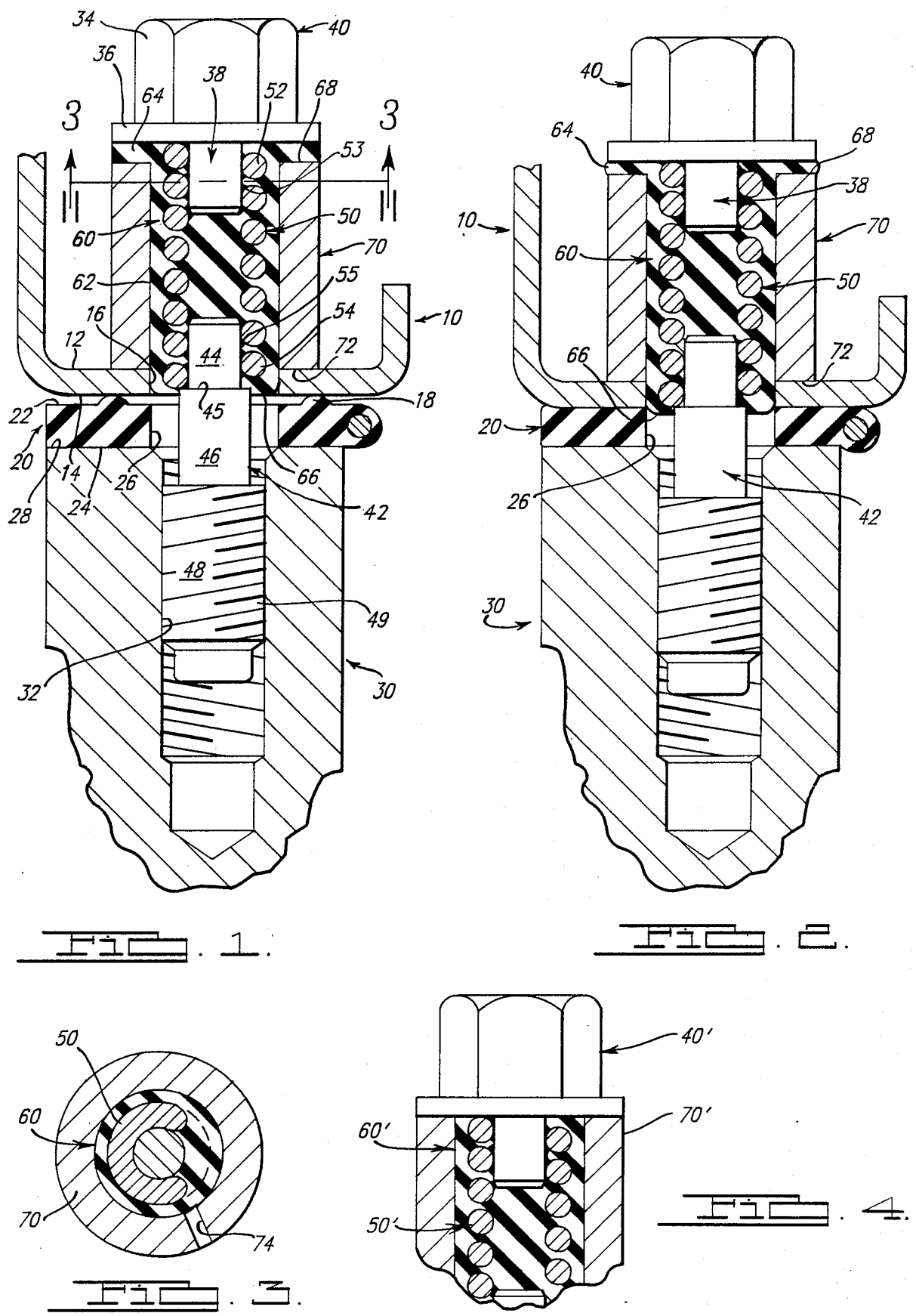

SELF-ADJUSTING FASTENER ASSEMBLY

This invention relates to a fastener for use in leakproof assemblies and in particular to an improved construction applying a controlled compression between a pair of members to be sealed by a gasket sandwiched therebetween.

In many assemblages of machined parts which when connected must be free from compression and leaks, such as a connection between the rocker cover and cylinder head of an automobile engine, the practice is to sandwich a gasket between mating surfaces of the parts to provide a leakproof seal therebetween. Gaskets are made from elastomeric materials in order to undergo sealing compression, however during the operating life of the installation the gasket material may undergo creep possibly resulting in unwanted leakage. To counter this the user oftentimes will increase the torque on the fastener to draw the parts more tightly together to reestablish compression of the seal. This is costly not only because of labor but more importantly so because the parts are often deformed when the fastener is overtightened, and leakage thus increased. An additional aggravation with many conventional fasteners is the transmission of noise from the engine.

Objects of this invention are to provide a fastener which is self-adjusting to control the compression (i.e., pressure) on the gasket which may expand or contract as the temperature changes or due to creep over the passage of time. Another object is provision of a fastener having means to prevent overtorquing. Torque is transmitted through a coil spring which is in tension. Such a fastener controls overtorque by the user because the spring takes on a new free length when the fastener is overstressed, and thus permits the use of a less expensive gasket. A further object is the provision of a fastener which reduces noise transmission.

Additional features and advantages of the present invention will become apparent from the subsequent description and the appended claims taken in conjunction with the accompanying drawings in which:

FIG. 1 is a cross-section view of a fastener for use in connecting a pair of parts of an automobile together;

FIG. 2 is similar to FIG. 1 showing the fastener in its fastened condition;

FIG. 3 is a sectional taken along line 3-3 of FIG. 1; and

FIG. 4 shows an alternate construction of a fastener.

Referring now to the drawings, FIGS. 1-3 show a generally planar elastomeric gasket 20 having top and bottom faces 22, 24 sandwiched between a rocker cover 10 and the cylinder body 30 of an automobile engine. A fastener 40 having a threaded end portion 48 passes through a bore 16 of the rocker and a bore 26 of the gasket to be threadably engaged within a threaded bore 32 of the cylinder. Rocker cover 10 has a peripheral mounting flange which is generally U-shaped in section and includes a surface 12 engaged by the fastener and a surface 14 pressed against a rib 18 on the top face of gasket 20. As shown in FIG. 1, fastener 40 has advanced and driven surface 14 into finger-tight relation with rib 18.

Fastener 40 includes a shank 38 extending from a bolt head 34 having a cylindrical flange 36, a stepped shank 42 having an inner end portion 44, a medial portion 46 and an outer end portion 48 provided with a conventional right-handed thread 49, a spring 50 rigidly secured to and connecting each of the shanks, an elastomeric body 60 encapsulating the coil spring, and a rigid sleeve 70 disposed around the elastomer. Each shank is generally cylindrical for disposition interiorly of the coil spring annulus with shank 42 having a rearwardly facing end face 45 abutting one end of the spring and flange 36 of head 34 abutting the other end.

Coil spring 50 is helically wound and defines a cylindrical annulus (or receptacle) at each end sized to fit around shank 38 and end portion 44 of shank 42. The inner surface of the coils form a section 52 at one end of the spring which is fittable onto inner end portion 38 and a section 54 at the other end of the spring which is fittable onto shank 44, each coil section being copper brazed at 53 or otherwise rigidly nonrotatably secured, respectively, to the shanks 38 and 42. The coil spring as shown is of cylindrical cross-section, defines seven coils, and the coils are wound so as to define a left-hand helix so that they tend to tighten or constrict, resulting in increased tension, when the fastener is torqued down. Preferably the spring would be comprised of a high carbon steel, such as 1090. In such event, the spring could be copper-plated to resist decarburization during brazing. Instead of planting with copper the spring can be made out of low carbon steel and the whole assembly to be brazed then carburized.

On of the significant advantages of the invention is that in the event of overtightening, the fastener will be overstressed and axially extend to a new length, thereby reducing, in this use, the likelihood of destroying/bending rocker cover 10 and/or overcompressing gasket 20. Desirably the spring rate would be high enough such that when the gasket starts collapsing, clamping forces will fall off fast enough to stop creep. That is the spring provides sufficient pressure against the rocker cover without causing excessive gasket creep and will adjust for the creep and/or heat expansion that does occur. In the event of excessive tightening the spring will be overstressed and assume a new free height-this will inhibit deformation of the rocker cover.

A body of elastomer 60 comprised of neoprene or epichlorohydren having a durometer of approximately 45 preferably totally encapsulates coil spring 50 so that no metal spring portions contact the parts to be fastened. As formed the body is cylindrical having an outer periphery 62, an outer annular flange 64 and an inner end portion 66 adapted to sealingly engage bore 16 to prevent spring 50 from touching rocker cover 10. Any suitable method of molding (e.g., compression or transfer molding) can advantageously be used.

The clamping force exerted by the fastener is transmitted from head 34 to the parts to be fastened via a sleeve 70 formed of a rigid material such as 1010 steel. Sleeve 70 is cylindrical in overall configuration, has an inward end face 72 engaging cover 10, an outer end face 68 engaging head 34 via elastomeric flange 64, and a slot 74 extending longitudinally between end faces 68, 72. Elastomeric flange 64 is sandwiched between sleeve 70 and flange 36 and thereby dampens spring vibration (e.g., resonance) and reduces noise transfer. The slot allows the sleeve to be expanded radially during assembly so that body 60 can be inserted therein. Preferably, the sleeve circumposes all loose coils disposed between shanks 38, 44.

Referring to FIG. 2 the fastener 40 has been threadably advanced such that the annular flange 64 forming the annular rearward end portion of the elastomer 60 is longitudinally compressed between cylindrical flange 36 and rearward end face 68 of the sleeve 70. The forward end 66 has invaded passage 26 of the gasket and engagingly seals about the passage and the top surface 22 of the gasket.

An alternate embodiment shown in FIG. 4 comprises a fastener 40′, a sleeve 70′ encircling a body of elastomer 60′ encapsulating a coil spring 50′, the elastomer not including the annular flange portion 64.

The fastener 40, 40′ with tension spring 50, 50′ encapsulated within sleeve 70, 70′ provides a sealing force that allows the gasket 20 to expand or contract and reduces extrusion of the gasket which is a primary cause of long-term gasket leak. The tension spring advantageously transmits torque from head portion 34 to threaded portion 48 to drivingly advance same into bore 32, the clamping relation initially being finger-tight with increased torquing of the fastener to mate the parts resulting in a tight seal on the gasket. Overtightening of the mated parts is prevented inasmuch as a controlled amount of overstressing in the spring is permitted. Long-term sealing is controlled by the tension spring because the overstressed spring remains in tension to maintain compression on a relaxing gasket.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A fastener comprising a head portion, a threaded portion, a coil spring having opposite end sections, each end section being rigidly and nonrotatably secured, respectively, to said one and said other portions, and a resilient body of elastomeric material encapsulating said coil spring.

2. A fastener comprising a head portion, a threaded portion, a coil spring having opposite end sections, each end section being rigidly secured, respectively, to said one and said other portions, a resilient body of elastomeric material encapsulating said coil spring, and a rigid sleeve encircling said body of elastomeric material to resist radial deformation of said body during longitudinal threading engagement of the fastener, the opposite ends of said sleeve being disposed adjacent one respective end of said coil spring.

3. The fastener as recited in claim 2 wherein the head portion includes an annular flange, and said elastomeric body includes an outwardly extending annular portion sandwiched between said flange and one end of said sleeve.

4. A fastener comprising a head portion, a threaded portion, a coil spring having opposite end sections, each end section being rigidly and nonrotatably secured, respectively, to said one and said other portions, and a resilient body of elastomeric material encapsulating said coil spring, said spring being helically wound with individual coils at each end section thereof defining a cylindrical inner surface sized to fit about and fixedly engage the outer periphery of its respective one of said portions.

5. A fastener comprising a head portion, a threaded portion, a coil spring having opposite end sections, each end section being rigidly secured, respectively, to said one and said other portions, and a resilient body of elastomeric material encapsulating said coil spring, said spring being coiled in an opposite hand as that of the thread on said threaded portion.

6. A fastener comprising a pair of axial shanks, one shank including a partially threaded portion extending therefrom and further comprising resilient torque means including a body of elastomeric material for transmitting torque from one shank to the other shank, said torque means interconnecting said shank portions and resisting relative axial movement therebetween.

7. The fastener as recited in claim 6 wherein said resilient torque means comprises a tension spring connected at one end to one of said shanks and at the opposite end to the other of said shanks, said spring being adapted to axially extend upon fastening engagement of said threaded portion.

8. The fastener as recited in claim 7 wherein said spring is encapsulated in said body of elastomeric material.

9. A fastener comprising a pair of axial shanks, one shank including a partially threaded portion extending therefrom and further comprising resilient torque means including a body of elastomeric material for transmitting torque from one shank to the other shank, said torque means interconnecting said shank portions and resisting relative axial movement therebetween, said torque means comprising a tension spring connected at one end to one of said shanks and at the opposite end to the other of said shanks, said spring being a helically coiled spring having a center axis, the inner surfaces of said coils at each end of the spring being sized to receive and be nonrotatably secured to one respective shank disposed therein with the coil axis being aligned with said shanks, said spring being adapted to axially extend upon fastening engagement of said threaded portion.

10. The fastener as recited in claim 9 wherein a continuous body of elastomer is disposed around and between adjacent coils to resist otherwise uninhibited axial expansion or contraction of said spring.

11. A fastener comprising: a pair of axial shanks, one shank including a partially threaded portion extending therefrom; resilient torque means including a body of elastomeric material for transmitting torque from one shank to the other shank, said torque means interconnecting said shank portions and resisting relative axial movement therebetween; and a sleeve encircling said resilient torque means for transmitting axial fastening force and maintaining the lateral exterior configuration of said resilient torque means.

12. A fastener comprising a pair of axial shanks, one shank including a partially threaded portion extending therefrom; resilient torque means including a body of elastomeric material for transmitting torque from the other shank to said one shank, said torque means interconnecting said shank portions and resisting relative axial movement therebetween; resilient torque means comprising a tension spring connected at one end to one of said shanks and at the opposite and to the other of said shanks, said spring being adapted to axially extend upon fastening engagement of said threaded portion, said spring is encapsulated in said body of elastomeric material and′ a rigid sleeve grippingly engaging the outer periphery of said body whereby to prevent radial distortion of said resilient torque means.

13. The fastener as recited in claim 11 wherein the other of said shanks includes an annular shoulder, said sleeve is generally cylindrically shaped and includes an annular end face, and said body includes an annular flange of elastomeric material extending radially therefrom and sandwiched axially between and engaging said shoulder and end face.

14. The fastener as recited in claim 9 wherein said coils have a helical pitch of opposite hand to that of said threaded portion.

15. A fastener comprising a pair of axially spaced, axially aligned, unthreaded axial shanks, one shank including a head and the other shank including a body having a threaded portion, and an axially extensible, substantially radially confined, torque transmitting coil spring extending between and nonrotatably connected at its opposite axial ends to a respective shank, whereby torque applied to the head is transmitted through the spring and to the body resulting in the threaded portion being driven.

16. A fastener comprising: a pair of axially spaced, axially aligned, unthreaded axial shanks, one shank including a head and the other shank including a body having a threaded portion; an axially extensible, substantially radially confined, torque transmitting coil spring extending between and nonrotatably connected at its opposite axial ends to a respective shank, whereby torque applied to the head is transmitted through the spring and to the body resulting in the threaded portion being driven; and a cylindrical body encompassing the spring and its connections to the shanks.

17. The fastener as recited in claim 16 wherein said cylindrical body comprises elastomer which completely encapsulates said spring.

18. A fastener comprising a pair of axially spaced, axially aligned, unthreaded axial shanks, one shank including a head and the other shank including a body having a threaded portion, and an axially extensive, substantially radially confined, torque transmitting coil spring extending between and nonrotatably connected at its opposite axial ends to a respective shank, whereby torque applied to the head is transmitted through the spring and to the body resulting in the threaded portion being driven, said torque transmitting spring being a helically wound coil with the interior surfaces of the end coil portions thereof being disposed about and secured to the respective shanks.

19. The fastener as recited in claim 15 wherein the coil spring is a tension spring which is axially extended and if extensed further is overstressed and permanently axially extended to assume a new length.

20. The fastener as recited in claim 15 wherein the coils are of opposite hand to that of said threaded portion.

21. A fastener comprising: a pair of axially spaced, axially aligned, unthreaded axial shanks, one shank including a head and the other shank including a body having a threaded portion; an axially extensible, substantially radially confined, torque transmitting coil spring extending between and nonrotatably connected at its opposite axial ends to a respective shank, whereby torque applied to the head is transmitted through the spring and to the body resulting in the threaded portion being driven; and a rigid cylindrical sleeve encompassing the spring and its connections to the shanks, said cylindrical sleeve comprising an elastomer which completely encapsulates said spring, said sleeve being disposed in gripping relation about the body of elastomer whereby to inhibit radial distension of the elastomer when torque is applied to the fastener.

* * * * *

UNITED STATES PATENT AND TRADEMARK OFFICE
CERTIFICATE OF CORRECTION

PATENT NO. : 4,906,154

DATED : March 6, 1990

INVENTOR(S) : William L. Sheppard

It is certified that error appears in the above-identified patent and that said Letters Patent is hereby corrected as shown below:

Column 2, line 24, "planting" should be -- plating --.

Column 2, line 27, "On" should be -- One --.

Signed and Sealed this

Sixteenth Day of July, 1991

*Attest:*

HARRY F. MANBECK, JR.

*Attesting Officer*     *Commissioner of Patents and Trademarks*